United States Patent
Vadnais

[15] 3,701,448
[45] Oct. 31, 1972

[54] ELECTRICAL JUNCTION BOX

[72] Inventor: James D. Vadnais, Stillwater, Minn. 55082

[22] Filed: April 29, 1971

[21] Appl. No.: 138,639

[52] U.S. Cl. .................................................. 220/3.9
[51] Int. Cl. .............................................. H02g 3/08
[58] Field of Search ............... 220/3.3, 3.9; 174/50

[56] References Cited

UNITED STATES PATENTS

| | | | |
|---|---|---|---|
| 1,805,027 | 5/1931 | Adell | 220/3.9 X |
| 3,080,084 | 3/1963 | Appleton | 220/3.9 |
| 3,214,126 | 10/1965 | Roos | 220/3.9 X |

FOREIGN PATENTS OR APPLICATIONS 886,504  10/1943  France...................174/50

Primary Examiner—M. Henson Wood, Jr.
Assistant Examiner—Edwin D. Grant
Attorney—Robert M. Dunning

[57] ABSTRACT

An electrical junction box having an indentation or groove on one side so that the box can be fitted over the ridges commonly found in typical roofing panels. Electrical conduit connecting holes in the box are positioned so that the conduit is directly in line with the edge of the ridges so as to avoid the necessity for bending the pipe. A spring clip in the groove on the box holds the electrical junction box in place on the ridge.

3 Claims, 3 Drawing Figures

PATENTED OCT 31 1972

3,701,448

INVENTOR
JAMES D. VADNAIS
BY Robert M. Dunning
ATTORNEY

ELECTRICAL JUNCTION BOX

BACKGROUND OF THE INVENTION

The most common method of constructing roofs in commercial structures today is to use reinforced bar joists which support large sheets of corrugated metal roofing panels. These roofing panels are generally flat having periodically spaced corrugations or ridges formed therein for strength. The ridges extend downward and the roof is completed by laying a layer of insulation on the corrugated panels and covering insulation with tar or other sealing materials. Electrical equipment such as conduit and junction boxes are added to the underside of the building roofs by fastening them just to the ridges so that the fastening screws cannot puncture the insulation on the roof. Fastened in this way the junction boxes have a tendency to tilt back and forth being rather precariously mounted. In addition, a great deal of labor is necessitated to take the electrical conduit pipes extending out of the box and bend them upwards so that they may also be secured to the ridges or the tops of the bar joists. Since these roofs are usually quite high, the job of mounting the boxes and bending the conduit is dangerous and time consuming. My invention avoids all of the above mentioned disadvantages as indicated below.

SUMMARY OF THE INVENTION

Briefly, my invention contemplates a junction box built according to standard code requirements but shaped to have an indentation or groove on the bottom which is congruent in cross-section to the corrugation or ridge on the ceiling. A small spring steel clip or clips are mounted in this groove which clips have tabs thereon extending outward so that the entire junction box may simply be slid over a ridge where it will hold itself in place. Since the entire body of the junction box is positioned higher, the holes therein for connecting electrical conduits to the box can be positioned directly in line with the edges of the ridges thus eliminating the necessity of bending the electrical conduit into alignment. From the foregoing description it may be seen that it is an object of my invention to provide a junction box which can be mounted more securely, more easily, and which will have greater strength once mounted. It is a further object of my invention to provide a junction box from which electrical conduits can be extended directly to the proper mounting points without the necessity of bending the conduits.

Further objects and advantages will become apparent from the following detailed description and drawings.

DESCRIPTION OF THE PREFERRED EMBODIMENT

Figure 1:
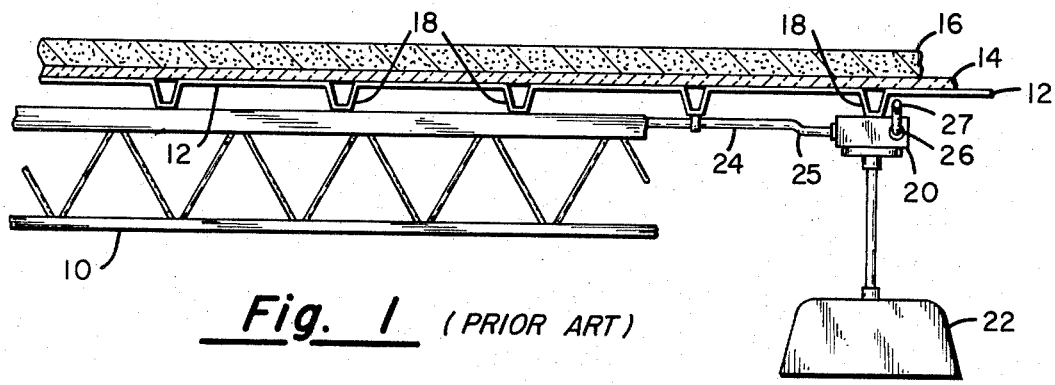
FIG. 1 demonstrates the common prior art roof construction along with the prior art type of electrical junction box.

In FIG. 1 a typical prior art construction is shown. A reinforced bar joist 10 is used to support a roofing panel 12 which has a series of corrugations or ridges 18 formed therein in order to add strength to the roofing panel. The roof is sealed with a layer of insulation 14 and a layer of sealing material 16 such as tar or the like. To avoid any possibility of piercing the insulation layers 14 and 16 electrical equipment must be mounted only to the ridges 18 as shown. A typical prior art electrical junction box 20 is mounted directly to the ridge. A junction box like this may have several electrical connections to it through conduits 24 and 27. In FIG. 1 it should be noticed that the conduits must be provided with small bends 25 and 26 in order to bring them up to a level where they can be connected directly to the ridges 18 or lay along the top of bar joists 10. It takes a large amount of time for an electrician to properly prepare bends 25 and 26. Furthermore it is time consuming and tedious to mount junction box 20 to ridge 18 since it must be held in place while small screws are inserted through box 20 into the flat portion of ridge 18. When a light fixture such as light fixture 22 is hung from the box a large amount of weight can be applied to ridge 18 and it is desirable that a rigid, non-tilting installation be afforded. Such a result is possible only with the apparatus of my invention.

Figure 2:
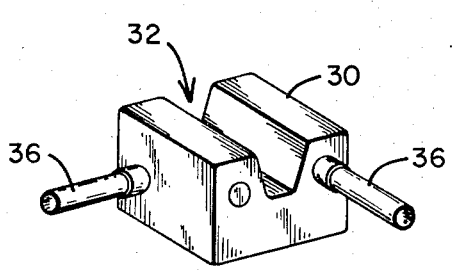
FIG. 2 is a perspective view of the junction box of the present invention.

In FIG. 2 the electrical junction box of my invention is shown. An indentation or groove 32 is provided in a box 30 which groove has a cross sectional shape designed to fit over the ridge 18. Connections to the box are made by electrical conduits 36 and are provided in a position such that they are directly in line with the bottom of ridges 18 or else directly in line with the tops of bar joist 10.

Figure 3:
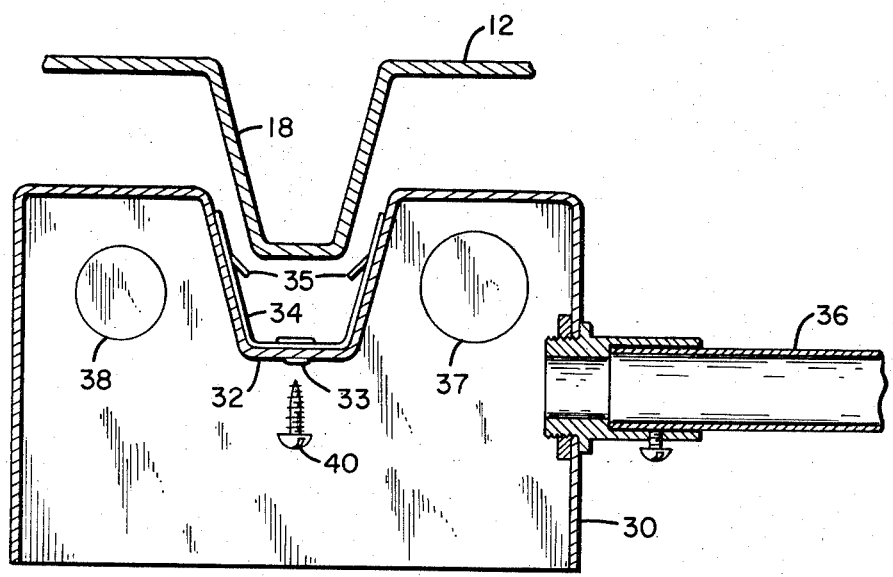
FIG. 3 is a cross-sectional view of the junction box of FIG. 2 showing how it is mounted to a ridge or corrugation by means of a spring steel clip in the groove.

In FIG. 3 my invention is described in greater detail. In FIG. 3 it may be seen that box 30 is provided with an additional clip 34 which may be formed of spring steel or the like and which is fastened in groove 32 by means of rivets 33. Of course, other forms of fastening the clip to the box will work as well. Clip 34 is provided with a pair of bent out tabs 35 so that box 30 may simply be slid into position over ridge 18 permitting tabs 35 to grip the sides of ridge 18 and hold the box in position. In many cases it has been found that this mounting procedure is in itself sufficient to hold the box in place especially if electrical conduits are extended out therefrom and fastened to adjacent ridges or to the top of bar joist 10. However, if a large heavy light fixture or the like is to be hung from the box additional fastening means such as a screw 40 may be inserted through a hole in the bottom of indentation or groove 32 and into ridge 18. Tabs 35 may also be formed directly into the sides of groove 32 in box 30 although this is a somewhat less of a preferred embodiment since the wall thickness and material composition of electrical junction box will usually be unsuitable since the box must conform to local electrical codes.

In FIG. 3 a typical conduit 36 is shown connected to box 30. In addition, a pair of typical connecting holes 37 and 38 are also shown. It should be noted that conduit 36 is connected to a hole which is positioned so that the top of conduit 36 is directly in line with the bottom of ridge 18 when box 30 is installed over ridge 18. Likewise holes 37 and 38 are so aligned that conduits attached thereto will be directly in line but above the bottom of ridge 18 so that they can conveniently be laid across the top of bar joists 10. Consequently, in order to install this box the electrician need not balance and hold the box in place while screw 40 is installed. He need only slide the box over ridge 18. Furthermore, the electrician need not make bends in the connecting conduit in order to route them properly. He need only install a straight piece of conduit which will automatically be aligned with the bar joist or the ridges. Thus, a much faster installation is possible. Furthermore, since box 30 is designed to wrap around the corrugation 18 there is no danger that the box can rock back and forth under the weight of a particularly heavy fixture. A neater and more professional looking job is provided as well. Of course, many modifications may be made to the spring clip mounting arrangement and to the position of holes in the junction box. In addition, it is contemplated that the groove 32 can be sized and shaped according to the size and shape of the corrugations with which it is to be employed. Since numerous modifications such as described above are possible the following claims are presented to cover only the inventive concepts in their proper spirit and scope.

I claim:

1. An electrical junction box for use with corrugated surfaces comprising a housing having a grooved section generally congruent in cross section to at least one of the corrugations in said surface and having outlet holes therein generally aligned with the edges of the corrugations in said surface.

2. The junction box of claim 1 including a spring member fastened to said box in said grooved section, said member having tab portions extending outward therefrom and adapted to grip the sides of a corrugation ridge on said surface upon insertion of said grooved section over said ridge.

3. The junction box of claim 2 including screw means to fasten said box to said ridge.

* * * * *